(12) United States Patent
Schneider et al.

(10) Patent No.: US 8,584,907 B2
(45) Date of Patent: Nov. 19, 2013

(54) POWER TOOL INCLUDING MOVEABLE REMOTE TRIGGER

(75) Inventors: Mark C Schneider, Moorestown, NJ (US); Joseph B Hanni, Cherry Hill, NJ (US)

(73) Assignee: Albion Engineering Co., Moorestown, NJ (US)

(*) Notice: Subject to any disclaimer, the term of this patent is extended or adjusted under 35 U.S.C. 154(b) by 1056 days.

(21) Appl. No.: 12/556,116

(22) Filed: Sep. 9, 2009

(65) Prior Publication Data

US 2011/0056996 A1    Mar. 10, 2011

(51) Int. Cl.
*B65D 88/54* (2006.01)

(52) U.S. Cl.
USPC ............ 222/333; 222/391; 222/386; 173/170

(58) Field of Classification Search
USPC ........... 222/386, 325, 391, 333, 63, 326, 327; 173/217, 170; 30/517
See application file for complete search history.

(56) References Cited

U.S. PATENT DOCUMENTS

| | | | |
|---|---|---|---|
| 3,389,838 A * | 6/1968 | Morra et al. | 222/630 |
| 4,640,444 A | 2/1987 | Bundschuh | |
| 4,691,461 A | 9/1987 | Behlert | |
| 5,184,757 A * | 2/1993 | Giannuzzi | 222/82 |
| 5,228,605 A * | 7/1993 | Schlichenmaier | 222/611.1 |
| 5,822,903 A | 10/1998 | Davis, Sr. | |
| 6,152,333 A * | 11/2000 | Binder | 222/333 |
| 6,557,745 B2 | 5/2003 | Wang | |
| 6,619,508 B2 * | 9/2003 | Balcome et al. | 222/136 |
| 6,702,206 B2 | 3/2004 | Wu | |
| 7,063,240 B1 | 6/2006 | Niswonger | |
| 7,228,917 B2 | 6/2007 | Davis et al. | |
| 7,950,549 B1 * | 5/2011 | Harris | 222/333 |
| 8,087,550 B2 * | 1/2012 | Schneider et al. | 222/325 |
| 2001/0052418 A1 * | 12/2001 | Wissmach et al. | 173/170 |
| 2005/0161241 A1 * | 7/2005 | Frauhammer et al. | 173/1 |

* cited by examiner

*Primary Examiner* — Paul R Durand
*Assistant Examiner* — Robert Nichols, II
(74) *Attorney, Agent, or Firm* — Caesar, Rivise, Bernstein, Cohen & Pokotilow, Ltd.

(57) ABSTRACT

In one embodiment, a dispensing device includes a receptacle for containing and dispensing the flowable material, such as caulk. The dispensing device also includes a drive member which moves a piston within the receptacle for dispensing the flowable material from the device. A handle is arranged to be gripped by an operator and includes a clamp member disposed over the receptacle which is arranged to move from an open position whereby the handle is moveable to any desired position along the receptacle, to a closed position for engaging the handle to the receptacle. A user input is provided on the moveable handle and adapted to be depressed by a user for operation of the device.

27 Claims, 5 Drawing Sheets

POWER TOOL INCLUDING MOVEABLE REMOTE TRIGGER

CROSS-REFERENCE TO RELATED APPLICATIONS

This application claims priority to U.S. application Ser. No. 12/183,481 ("the '481 application"), filed on Jul. 31, 2008, the disclosure of which is incorporated by reference in its entirety.

FIELD OF THE INVENTION

The present invention relates generally to dispensing devices, such as caulking guns, and other types of power tools that are utilized for different applications. Such other power hand tools may include hand drills, hand saws, grass and weed trimmers, leaf blowers, vacuums, etc. More particularly, the present invention relates to a trigger for use in conjunction with such tools and devices that is moveable to a location on the tool or device that is suitable to the operator, based upon the type of work being performed.

BACKGROUND OF INVENTION

During the production of automotive vehicles, for example, a fabricator uses a dispensing gun to apply a bead of sealant to the vehicle frame prior to the installation of an automobile windshield. The bead is applied along a pinch-weld in the frame defining the windshield periphery, and the windshield is positioned thereon. One edge of the windshield is applied to the adhesive bead in the pinch weld, and then the windshield is released and pressed into place. On commercially available dispensing devices, the trigger mechanism is located at the rear end of the device and beneath the cylinder containing the sealant, making precise application of the sealant bead difficult and cumbersome when used during the installation of a windshield. For this application, it would be desirable to locate the trigger close to the dispensing nozzle end of the device, rather than the rear.

By contrast, for other applications where flowable compositions such as caulking materials, grease, and reactive resins are dispensed, the area of application is often at elevated, overhead, or relatively inaccessible positions, such as a room ceiling or at a location where room floor and walls meet. For these applications, it is desirable to locate the trigger at a position that is remote from the workpiece to avoid unnecessary reaching, kneeling, or squatting, thus reducing the risk of strain or other injury. Thus, under the present invention, the trigger is moveable to different locations on the dispensing device depending upon the type of work being performed. The present invention fulfills these needs and provides other related advantages. Likewise, it would be desirable to provide a moveable trigger on power hand tools to enable repositioning of the trigger to different locations on such hand tools such as drills, hand saws, weed and grass trimmers and the like, based upon the type of work being performed.

SUMMARY OF THE INVENTION

In one embodiment, a dispensing device includes a receptacle for containing and dispensing the flowable material, such as caulk. The dispensing device also includes a drive member which moves a piston within the receptacle for dispensing the flowable material from the device. A handle is arranged to be gripped by a user and includes a clamp member disposed over the receptacle which is arranged to move from an open position whereby the handle is moveable to any desired position along the receptacle, to a closed position for engaging the handle to the receptacle. A trigger is mounted on the moveable handle and can be positioned at a location on the dispenser to suit the user based upon the application.

DETAILED DESCRIPTION OF THE INVENTION

Referring now in detail to the various figures of the drawings wherein like reference characters refer to like parts, there is shown at 10 in FIGS. 1-4, a device for dispensing materials including the moveable remote trigger in accordance with the present invention. The dispensing device 10, e.g., a caulking gun, includes a forward located barrel 14 of conventional design for housing a composition to be dispensed, and a rearward located housing 18 for receiving a motor assembly (not shown). It should be understood that the barrel 14 can be of any desired construction or configuration for housing a composition to be dispensed, and does not constitute a limitation on the present invention. For example, although the embodiment chosen for illustration herein includes a single barrel for dispensing a composition, the dispensing device could include a dual component carriage assembly of conventional design for housing a plurality, e.g., two, cartridge assemblies containing components to be dispensed. Often such cartridge assemblies contain components which cannot be mixed together until immediately prior to use. Typical examples of such materials are epoxy resin compositions which are mixed when used with a hardener component which causes subsequent curing of the resin. Viscous materials such as caulks are also commonly dispensed from such dual component dispensing devices.

Fitted within the barrel 14, is a piston assembly of conventional construction and including a piston (not shown) axially mounted to a piston rod 16. The piston assembly serves to extrude the composition through the barrel 14 as the piston assembly advances to ultimately extrude the composition through a nozzle 22 carried by a front cap 26 generally threaded onto the dispensing end of the barrel 14. The nozzle 22 may or may not be a part of the dispensing device 10. For example, where composition is to be dispensed from a hard cartridge having its own nozzle, the nozzle 22 is not a part of the dispensing device 10. The piston rod 16 is advanced by means the motor assembly (not shown), located within the drive housing 18, through known linkages (not shown) between the motor assembly and the piston assembly.

Composition to be dispensed from the barrel may initially be packaged in different forms. For example the composition may initially be packaged in a single disposable and replaceable hard cartridge or container arranged for placement within the receptacle 14 for dispensing. Alternatively, the composition may initially be packaged in bulk form, or contained within a flexible, sausage-type packaging. The composition to be dispensed from the device 10 may be caulking materials, grease, automotive windshield sealant, resins, and the like. The front cap 26 also serves to contain a hard cartridge within the barrel 14 during dispensing.

The device 10 also includes a power supply (not shown) located within a housing 30 and a moveable trigger assembly 34. The power supply may be a conventional battery and is electrically connected to the motor assembly through a conventional switch. The trigger assembly 34 includes a manually actuable trigger 38 which shown as being slidably mounted within a housing 42. Alternatively, the trigger 38 could be pivotally mounted within the housing 42. In either case, the trigger 38 is spring loaded or biased in a direction away from the housing 42 by any suitable means, e.g., a compression spring. The trigger 38 is actuated by a user moving the trigger 38 towards the housing 42 with one or more fingers. The housing 42 also serves as a hand grip.

Figure 1:
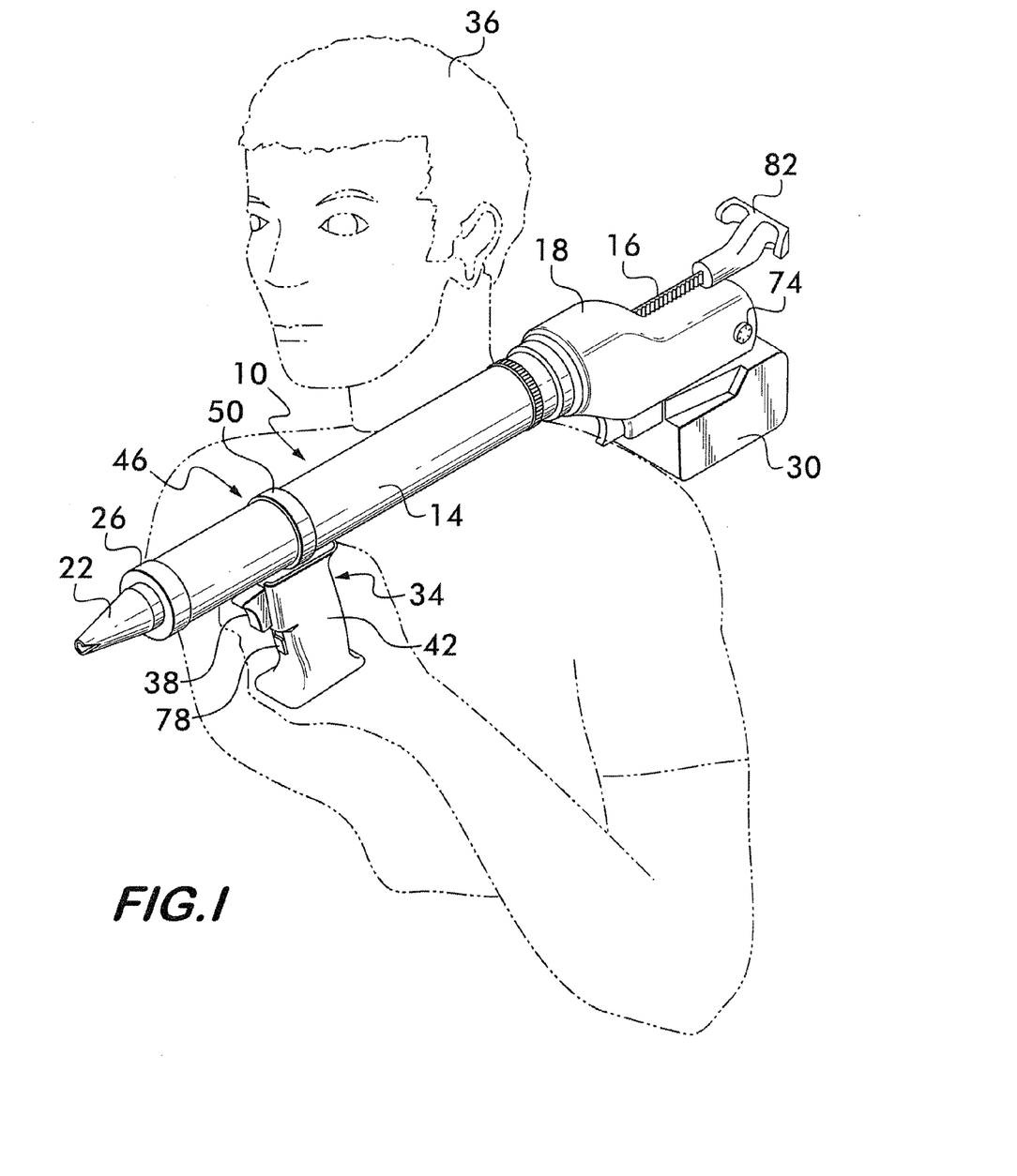
FIG. 1 is a perspective view of a dispensing device utilizing the moveable remote trigger assembly of the present invention being used by an operator.
Figures 2, 3, 4:
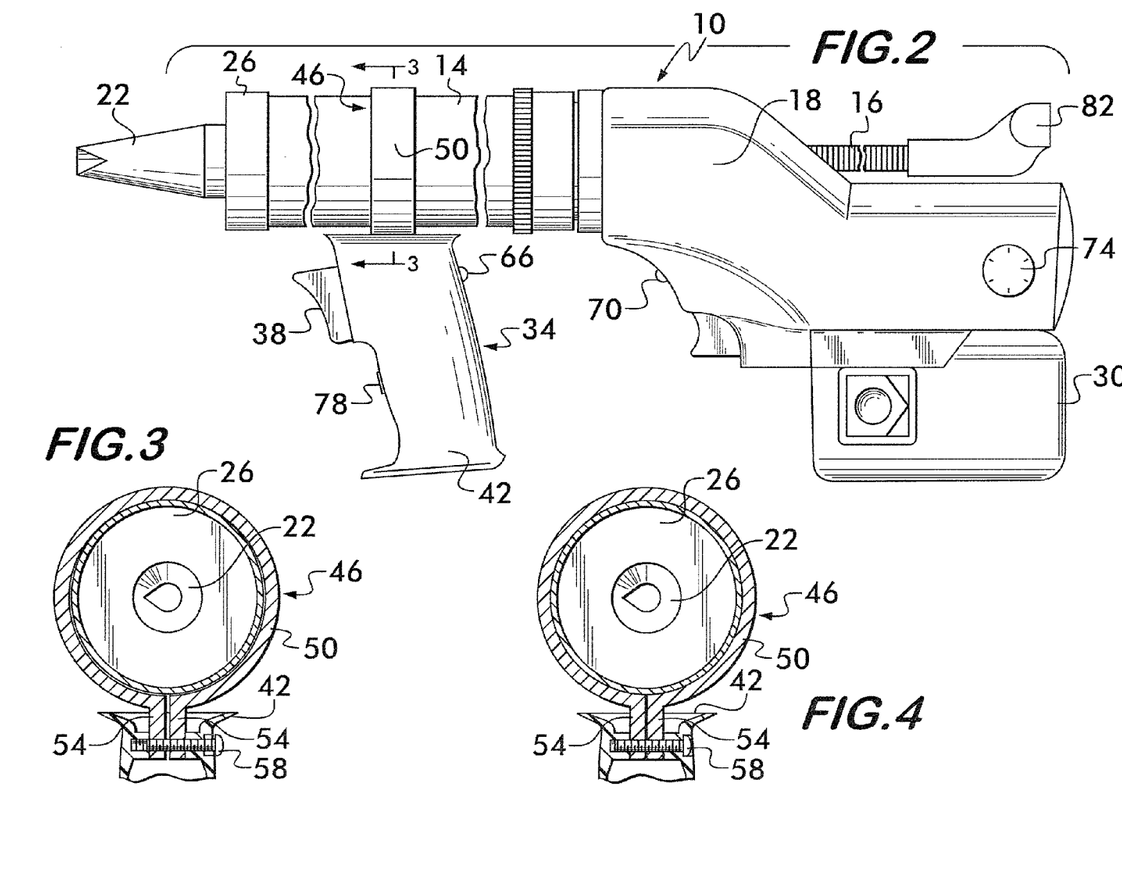
FIG. 2 is an enlarged cut-away elevational view of a dispensing device utilizing the moveable remote trigger assembly of the present invention.
FIG. 3 is a sectional view taken along lines 3-3 of FIG. 2 showing the openable clamp in the open position.
FIG. 4 is a sectional view of the dispensing device utilizing the moveable remote trigger assembly of the present invention showing the openable clamp in the closed position.

In operation, the trigger 38 is pulled toward the hand grip 42 (FIG. 1) which causes the piston assembly to apply a greater amount of force against the composition to be dispensed to extrude the composition through the barrel 14 and through the nozzle 22. As the trigger 38 is pulled toward the hand grip 42 with greater or lesser force, the piston assembly applies greater or lesser pressure against the composition to be dispensed. Since the viscosity of the composition to be dispensed varies, an appropriate amount of pressure may be applied to the trigger 38 to dispense composition at a desired rate of speed through the nozzle 22. A threshold speed control knob 74 is provided and is shown mounted onto the outside of the housing 30. The speed control knob 74 is adjustable to control threshold speed at which the piston assembly advances through the barrel 14. In addition, a safety lock 78 is provided to enable the user to release the trigger 38 while continuing to dispense. Additionally, as best shown in FIGS. 1 and 2, a return lever 82 located at the proximal end of the piston rod 16 allows the user 36 to withdraw the piston rod 16 after dispensing of the composition has been completed. Although the return lever 82 is illustrated in FIGS. 1 and 2, is shown as being of a particular shape, it is to be understood that this is not limiting and the return lever 82 can take other shapes.

As shown in FIGS. 1 through 4, the trigger assembly 34 is mounted to the barrel 14 by means of a releaseable clamp assembly 46. The clamp assembly 46 includes a strap 50 that may be flexible and is configured to encircle the barrel 14, although the strap 50 could be configured differently based upon a different configuration of the barrel 14. Referring now to FIGS. 3 and 4, the clamp assembly 46 additionally comprises a pair of opposed securement flanges 54 extending radially outwardly from the ends of the strap 50 to form a bracket. Each securement flange 54 is provided with an aperture. A suitably sized adjustment screw 58 is arranged to be disposed through apertures in the opposed flanges 54. The adjustment screw 58 is arranged to enable movement of the strap 50 between a tightened position (best shown in FIG. 4) wherein the strap 50 engages the exterior surface of the barrel 14 to prevent movement of the trigger assembly 34 along the barrel, and a release position (best shown in FIG. 3), wherein the flanges 54 are maintained in a held-apart relationship. In this manner, the strap 50, and thus the trigger assembly 34 are disengaged from the barrel 14 exterior surface and free to be moved, e.g., slid, to any desired location and orientation over the length of the barrel 14. Thus, the location and position of the trigger assembly 34 may be adjusted depending upon the intended use of the dispensing device.

Figure 5:
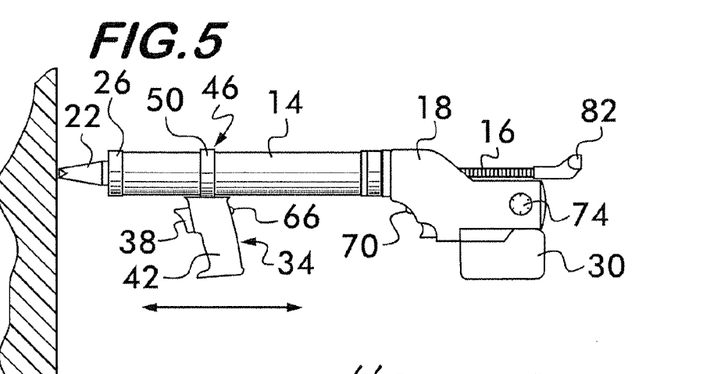
FIG. 5 is an elevational view of a dispensing device utilizing the moveable remote trigger assembly of the present invention wherein the trigger assembly is oriented in a first position and towards the dispensing end of the device.

Referring now to FIGS. 1 and 5 through 7, the trigger assembly 34 is shown in different positions and orientations on the barrel 14 to facilitate use of the dispensing device 10 in different applications. For example, as shown in FIG. 1, a user 36 is shown carrying the rear portion of the dispensing device 10 on his shoulder and holding the trigger assembly 34 with his left hand. In FIG. 1, the trigger assembly 34 is shown as being situated beneath the barrel 14 and towards the dispensing end of the device 10. In FIG. 5, the trigger assembly 34 is also shown as being positioned towards the dispensing end of the device 10 and beneath the device barrel 14. For example, with the trigger assembly 34 situated in this position and orientation on the barrel 14, the dispensing device 10 is best suited for application of a flowable material to a wall or other vertical surface when dispensing is being made in proximity of the user's torso, e.g., between the user's waist and shoulders.

Figures 6, 7:
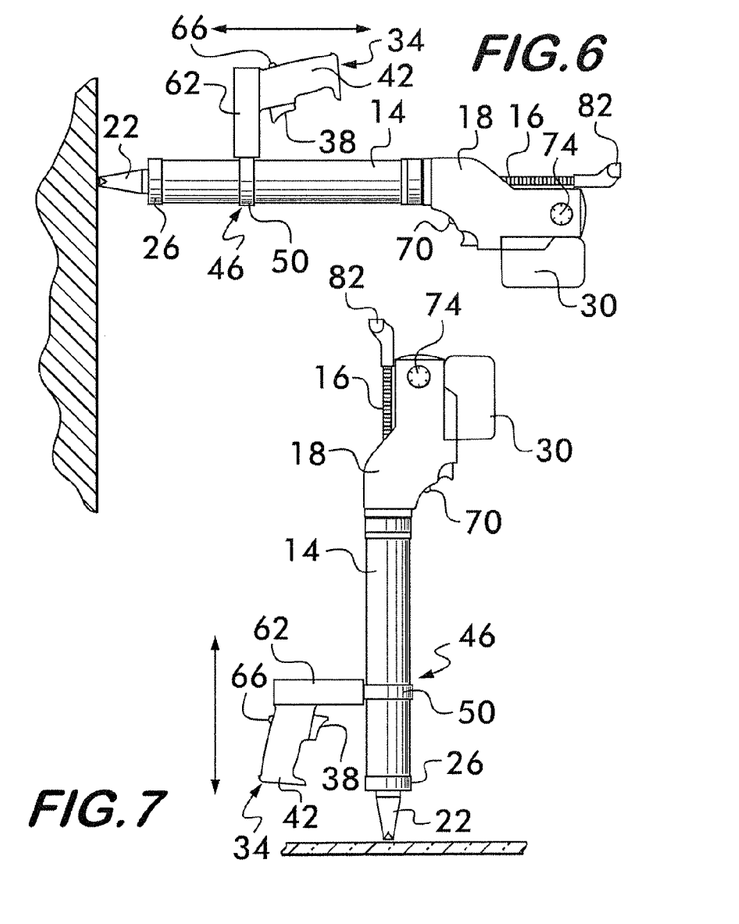
FIG. 6 is an elevational view of a dispensing device utilizing the moveable remote trigger assembly of the present invention wherein the trigger assembly includes an extension piece and is oriented in a second position.
FIG. 7 is an elevational view of a dispensing device utilizing the moveable remote trigger assembly of the present invention wherein the trigger assembly includes an extension piece and is oriented in a third position.

Referring now to FIG. 6, the trigger assembly 34 is shown positioned towards the dispensing end of the device 10 and above the barrel 14. The trigger assembly 34 is shown as being connected to an extension piece 62, and in turn, the extension piece 62 is shown connected to the clamp assembly 46 utilizing suitable hardware. As shown in FIG. 6, the trigger assembly 34 is positioned above the barrel 14 and is separated from the barrel 14 by the elongated extension piece 62. In this manner, during use, the extension piece 62 of the dispensing device 10 enables a 90° rotation of the trigger assembly 34 to facilitate use of the device 10 to dispense flowable material to low locations, such as where a floor meets a wall, without requiring the user to bend over, kneel down or squat during dispensing, thus reducing the risk of strain or other back injury, or to high locations. Due to the extension piece, the user holds the dispensing device 10 like a suitcase. The construction and use of the extension piece 62 is discussed in further detail in U.S. patent application Ser. No. 12/183,481 ("the '481 patent application"). Applicants hereby incorporate by reference the entire subject matter of the '481 patent application and also claim the benefit of the filing date of the '481 patent application for this utility patent application.

As shown in FIG. 7, the trigger assembly 34 is positioned above the barrel 14 using the extension piece 62. The trigger assembly 34 situated in this position and orientation on the barrel 14 also suits use of the dispensing device 10 for applying a bead of sealant to a vehicle frame prior to the installation of an automobile windshield. Other positions and orientations of the trigger assembly 34, with and without the extension piece 62, are possible and within the scope of this invention.

Referring now to FIG. 2, the dispensing device 10 additionally includes a remote control system utilizing a transmitter 66 located on the trigger assembly 34 and a receiver 70 located on the housing 18. The remote transmitter 66 emits light waves preferably in the infrared region upon the actuation of the trigger 38. The receiver 70 may be an infrared light detector that receives infrared emissions from the transmitter 66. Upon receipt of such an emission, the receiver 70 is arranged to send a signal closing a switch as is known in the art to provide electrical energy to the motor assembly within the housing 18. The motor assembly may be actuated by electrical energy supplied by the battery (not shown) as is known. In an alternative embodiment, the motor assembly may be configured to be actuated by alternate forms of energy, for example a pneumatic type of energy. Alternatively, the remote control system may utilize a transmitter 66 having signal generating circuitry for generating signals in the radio frequency range so that the receiver does not need to be located in direct line of sight with the transmitter. In one operational configuration, which is conventional, once actuated, the motor assembly applies a force which is transferred to the piston shaft and piston, urging the piston shaft in the direction of the dispensing nozzle 22. The piston advances through the barrel 14. Thus, caulking material, not illustrated, may thus be extruded from dispensing nozzle 22. Upon release of the trigger 38, the transmitter 66 sends another signal to the receiver 70 to cut off the energy supplied to the motor assembly to stop advancement of the piston in the receptacle.

It should be understood that although the dispensing device described herein is described as being a cordless dispensing device utilizing a motor and battery, the dispensing device could be of any desired construction, and such use of a motor and battery does not constitute a limitation on the present invention. For example, the dispensing device of the present invention could be powered by a pneumatic source, i.e., pressurized air or another pneumatic source.

Figure 8:
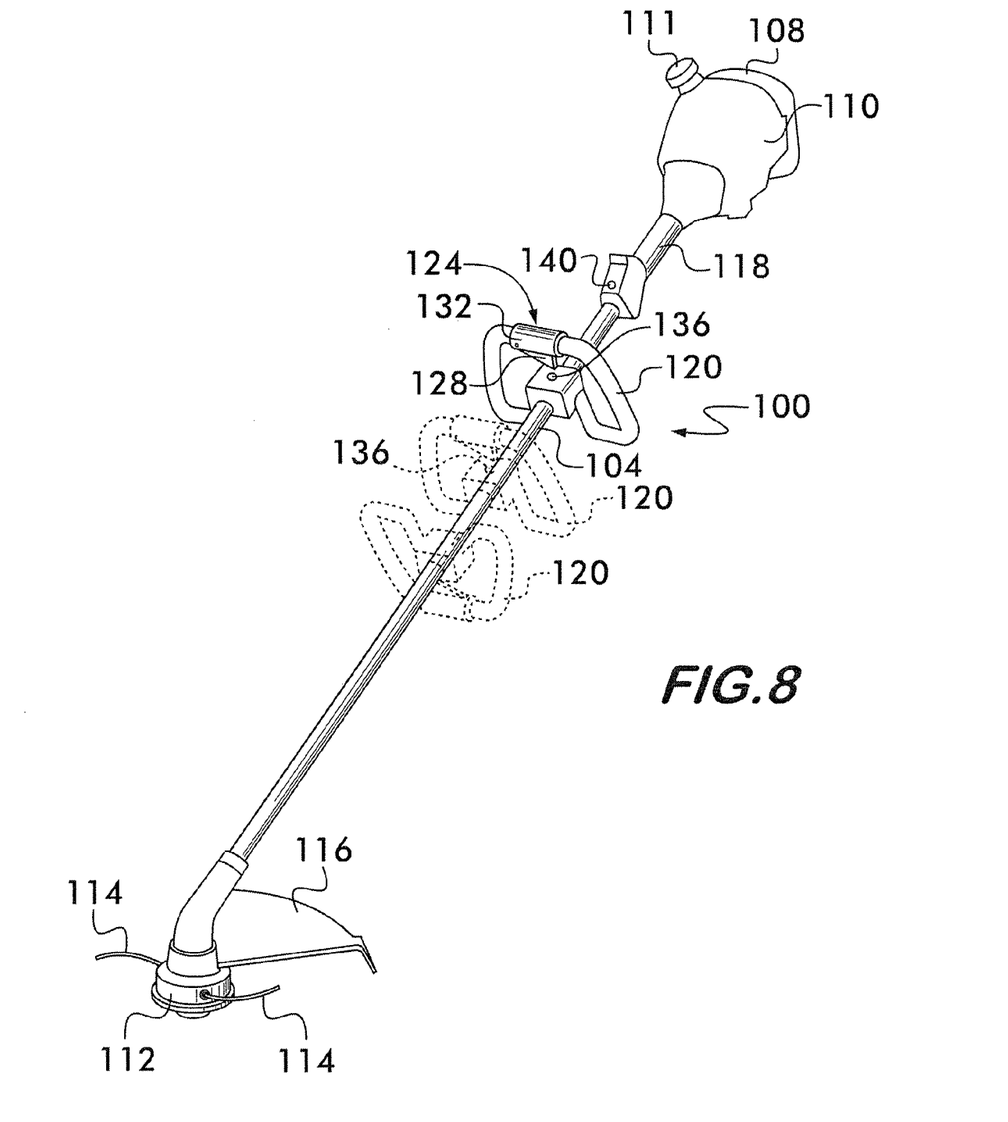
FIG. 8 is a perspective view of a weed and grass trimmer utilizing the moveable remote trigger assembly of the present invention; and, FIG. 9 is a perspective view of an embodiment including a plurality of dispensing devices utilizing the moveable remote trigger assembly of the present invention.

Referring now to FIG. 8, there is shown at 100 a grass and weed trimmer including the moveable remote trigger in accordance with the present invention. Grass and weed trimmers are used to cut grass, weeds and similar unwanted vegetation around sidewalks, trees, fences and other confined areas that a lawn mower cannot reach. A conventional weed trimmer typically includes a head having a line that is rapidly rotated to cut the unwanted vegetation. Although the general construction and operation of a weed trimmer is well known, it will be described herein to the extent necessary for an understanding of the remote moveable trigger of the present invention. As shown in FIG. 8, the weed trimmer 100 includes an elongated boom 104 having a motor 110 at one end and a cutting head 112 at the other end. One or more cutting lines 114 project from the cutting head 112. The motor 110 may be powered by gasoline, propane, or the like or alternatively, may be powered electrically, or pneumatically. As shown in FIG. 8, the motor 110 is powered by gasoline and includes a small tank 108 for containing gasoline including a cap 111 to enable filling the tank 108. The motor 110 will typically be connected to the cutting head 112 by a drive shaft (not shown) located within the elongated boom 104 in ways that are known. A guard 116 is located above the cutting head 112. During operation of the motor 110, the cutting head 112 rotates and the cutting line 114 cuts weeds, grass and other vegetation. During use, the operator of the weed trimmer 100 typically grasps a fixed grip 118 located adjacent the motor 110 with one hand and grasps a moveable handle 120 with the other hand to hold the trimmer head 112 over the weeds, grass or other vegetation being cut.

Mounted to the moveable handle 120 is a trigger assembly 124 which includes a manually actuable trigger 128 which is shown as being pivotably mounted within a housing 132. The trigger 128 is spring loaded or biased in a direction away from the housing 132 by any suitable means, e.g., a torsional spring. The weed trimmer 100 additionally includes a remote control system utilizing a transmitter 136 located on the handle 120 and a receiver 140 located in proximity to the fixed handle 118. The remote transmitter 136 emits light waves preferably in the infrared region upon the actuation of the trigger 128. The receiver 140 may be an infrared light detector that receives infrared emissions from the transmitter 136. Upon receipt of such an emission, the receiver 140 is arranged to actuate the motor 110 in known ways. Alternatively, the remote control system may utilize a transmitter having signal generating circuitry for generating signals in the radio frequency range so that the receiver does not need to be located in direct line of sight with the transmitter.

As shown in FIG. 8, the moveable handle 120 is shown as being adjustable, e.g., slideable, to different positions along the length of the elongated boom 104, as well as rotatable through 360° of rotation on the elongated boom 104. In this manner, the weed trimmer 100 may be utilized for a variety of applications other than for traditional grass and weed trimming. For example, by positioning the moveable handle 120 closer to the cutting head 112 (as shown in phantom in FIG. 8), the cutting head 112 can readily be raised above the ground for use in applications such as hedge trimming. The moveable handle 120 with the trigger assembly 124 mounted thereon also increases ease of use where the weed trimmer 100 is provided with a cutting head 112 that is arranged to be interchanged with heads for applications other than grass and weed trimming, e.g., reciprocating hedge shearing head, chain saw head, or leaf blower head. Positioning the moveable handle 120 closer to the working head in these other applications facilitates use in such applications.

Figure 9:
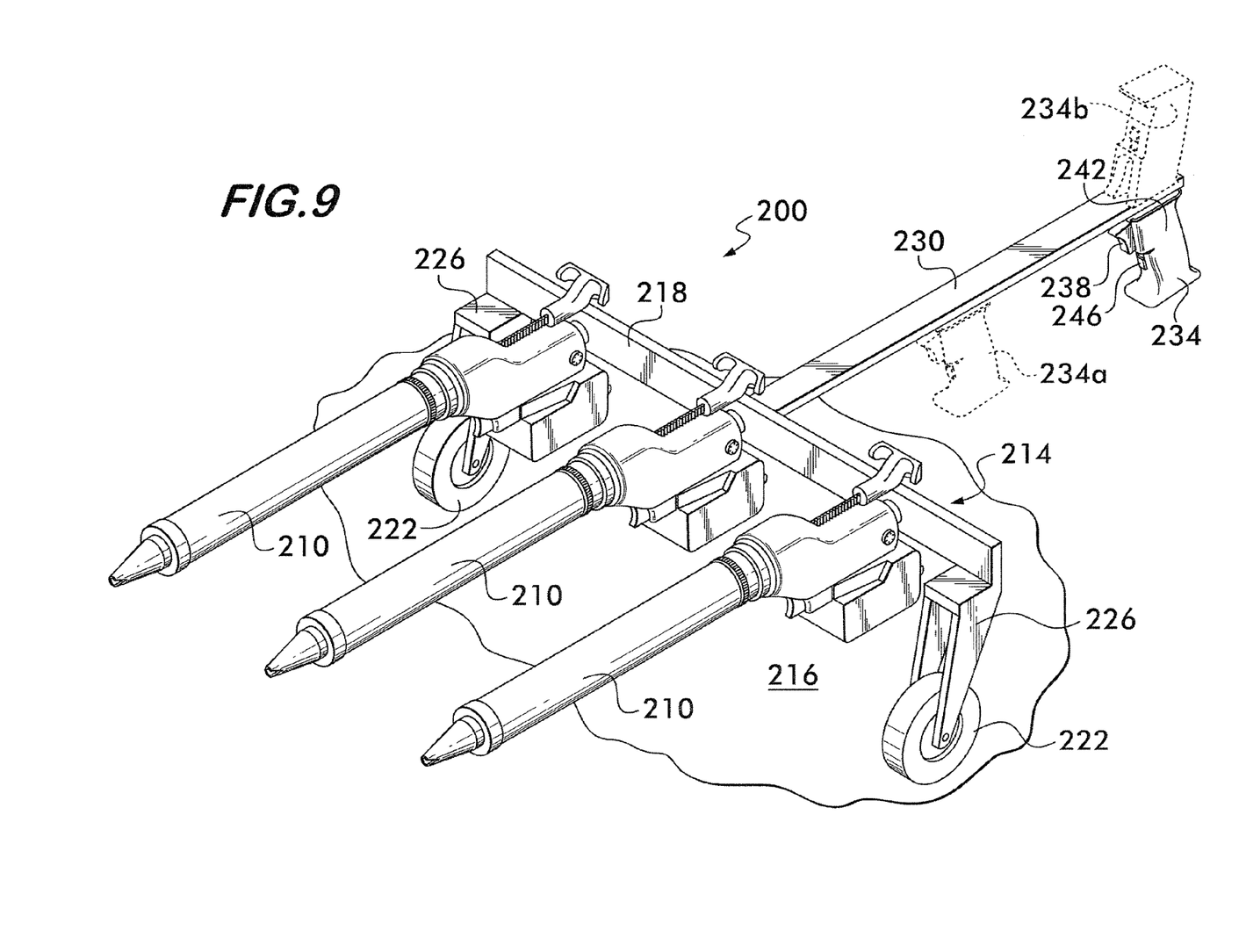

Referring now to FIG. 9, there is shown at 200 an embodiment of the present invention wherein a plurality of dispensing devices 210 are shown mounted to a single carriage assembly 214. The carriage assembly 214 includes a cross piece 218 to which each of the dispensing devices 210 is mounted by any suitable means, e.g., mounting bolts (not shown). Although FIG. 9 illustrates three dispensing devices 210 mounted to the carriage assembly 214, it should be understood that the number of devices 210 shown in the figure is merely exemplary and a greater or fewer number of devices 210 could be mounted to the carriage assembly 214 depending upon the intended use of the embodiment 200. As shown in FIG. 9, the devices 210 are spaced apart from one another by an equal distance. However, depending upon the application, the dispensing devices 210 could be adjusted along the length of the cross piece 218 to different locations for equal or unequal spacing therebetween. The carriage assembly 214 includes wheels 222 retained within brackets 226 to facilitate positioning and movement of the carriage assembly 214 by an operator (not shown) over a surface 216 during dispensing a flowable material such as an adhesive, sealant or caulking material from the dispensing devices 210.

The carriage assembly 214 also includes an extension piece 230 to which a trigger assembly 234 is moveably mounted. The trigger assembly 234 includes a manually actuable trigger 238 which is slidably mounted within a housing 242. The trigger housing 242 also serves as a hand grip. As described in the earlier embodiments of FIGS. 1 through 8, the dispensing devices 210 utilize a remote control system for dispensing flowable material which includes a transmitter 246 located on the trigger assembly 234 and a receiver (not shown) located on each dispensing device 210. However, under this embodiment 200, the receiver (not shown) of each dispensing device 210, is arranged to receive a common signal transmitted from the single transmitter 246 to dispense flowable material therefrom. Thus, upon actuation of the trigger 238, flowable material is dispensed from each dispensing device 210 in a simultaneous fashion, thus saving both time and effort. For one application, the embodiment 200 may be utilized for simultaneously applying multiple beads of adhesive material to one or more large pieces of sheet material 216 intended for adherence to the roof of a building. Dispensing multiple beads of adhesive simultaneously saves both time and effort.

As shown in FIG. 9, the trigger assembly 234 is free to be moved, e.g., slid, to any desired location and orientation over the length of the extension piece 230. Thus, the location and position of the trigger assembly 234 may be adjusted depending upon the intended use of the embodiment 200. Referring again to FIG. 9, the trigger assembly 234 is shown at two exemplary positions as it extends beneath the extension piece 230.

At 234, the trigger assembly is shown extending beneath the extension piece 230 and is located at a point on the extension piece 230 that is most remote from the cross piece 218. At this location, the trigger assembly 234 is shown with the trigger 238 facing towards the cross piece 218. However, it should be understood that the trigger assembly could be mounted at this position, or at any position along the extension piece 230, with the trigger 238 facing away from the cross piece 218. At 234a, the trigger assembly is shown extending beneath the extension piece 230 and is located at a point approximately midway along the length of the extension piece 230. It should be understood that the positions of the trigger assembly at 234 and 234a are merely exemplary and the trigger assembly 234 could be slid to any position along the length of the extension piece 230 to suit the operator depending upon the application in which the embodiment is to be used. Likewise, the trigger assembly 234 could be oriented at any position along the length of the extension piece 230 with the trigger 238 facing towards or away from the cross piece 218, depending upon the preference of the operator for particular applications. At 234b, the trigger assembly 234 is shown in an alternative exemplary orientation as extending above the extension piece 230, with the trigger facing towards the cross piece 218. In this orientation, the trigger assembly 234b is arranged to slide to any position along the length of the extension piece 230 to suit the operator's needs for a particular application. Alternatively, the trigger 238 could face away from the cross piece 218.

The devices of the present invention have been described in respect to the particular embodiments thereof set forth in the specification and as illustrated in the drawings. As a result of such disclosure, other variations and modifications may become apparent to those skilled in the art and therefore, no limitation as to the scope of the invention is intended by the specific embodiments disclosed but the scope of the invention is to be interpreted in view of the appended claims. For example, the moveable handle and trigger concept described herein could readily be adapted to other hand tools not disclosed herein such as power drills, leaf blowers, reciprocating hedge trimmers, hand-held power saws, etc.

We claim:

1. A device for dispensing flowable material including a positionable user input, said device comprising:
   a. a receptacle having a dispensing end, a rearward end, and a length therebetween, said receptacle provided for containing and dispensing a flowable material;
   b. a housing for receiving a motor assembly, said housing being located rearward of said receptacle;
   c. a drive member for moving a piston disposed within said receptacle in a forward ejecting direction to dispense flowable material from said receptacle;
   d. a handle arranged to be gripped by an operator during dispensing of the flowable material, said handle including an engagement member arranged for engaging said handle to said receptacle at any of a plurality of predetermined positions along the length of said receptacle between said dispensing and rearward ends thereof, said engagement member being releasable from said receptacle at a first position located a first predetermined distance from said housing to enable movement of said handle from said first position to a second position located a second predetermined distance from said housing, said first and second predetermined distances being unequal; and,
   e. a user input disposed on said moveable handle and adapted to be depressed by a user for operation of said device.

2. The device of claim 1, wherein said user input is an actuable trigger.

3. The device of claim 1, wherein said device additionally comprises signal generating circuitry coupled to said user input, wherein upon actuation of said user input, said circuitry transmits a signal to a receiver coupled to said drive member to activate said drive member to supply pressure for displacing said piston in said ejecting direction for dispensing flowable material.

4. The device of claim 1, wherein said receptacle is generally cylindrical in shape, and wherein said engagement member comprises a clamp, said clamp comprising a circular-shaped band arranged to extend over said cylindrical receptacle and having first and second ends.

5. The device of claim 4, wherein said clamp additionally comprises a pair of flanges extending radially outwardly from the first and second ends, said clamp additionally comprising an adjustment screw extending through openings in said flanges to move said clamp between disengaged and engaged positions.

6. The device of claim 2, wherein said user input is slidably disposed within said handle.

7. The device of claim 2, wherein said user input is pivotably disposed within said handle.

8. The device of claim 3, wherein said signal generating circuitry generates signals to be transmitted in the radio frequency range.

9. The device of claim 3, wherein said signal generating circuitry generates signals to be transmitted in the infrared range.

10. The device of claim 1, wherein said piston is arranged to move between said ejecting direction and a return direction.

11. The device of claim 1, additionally comprising a return handle for moving said piston in said return direction.

12. The device of claim 2, wherein said actuable trigger controls the speed of movement of said piston in said forward ejecting direction.

13. The device of claim 1, wherein said drive member comprises a motor, and wherein said device additionally comprises a power source for powering said motor.

14. The device of claim 13, wherein said power source is a battery.

15. The device of claim 13, wherein said device is cordless.

16. The device of claim 14, additionally comprising a control mechanism coupled to said motor to assure that said piston does not exceed a predetermined threshold speed as it moves in the forward ejecting direction.

17. The device of claim 16, wherein said control mechanism is in the form of a maximum speed dial which controls speed of movement of said piston between 1 and 23 inches per minute in said ejecting direction.

18. The device of claim 1, wherein said receptacle is in the form of a barrel.

19. The device of claim 18, wherein said user input is oriented above said barrel during use of the device.

20. The device of claim 18, wherein said user input is oriented below said barrel during use of the device.

21. The device of claim 18, additionally comprising a nozzle disposed at the distal end of said barrel.

22. The device of claim 1, wherein said flowable material is initially packed within a hard cartridge, said hard cartridge arranged to be disposed within the tubular wall portion of said receptacle.

23. The device of claim 22, wherein said hard cartridge includes a dispensing nozzle.

24. The device of claim 23, wherein said flowable material is caulk.

25. The device of claim 1, wherein said flowable material is provided in bulk form.

26. The device of claim 1, wherein said flowable material is initially packaged in a flexible, sausage-type package.

27. The device of claim 1, wherein said receptacle is in the form of a dual component carriage assembly.

* * * * *